May 12, 1959  G. A. M. PETERSEN  2,886,292
HEAVY DUTY CUTTING HEAD FOR EARTH BORING TOOLS
Filed April 9, 1956  2 Sheets-Sheet 1
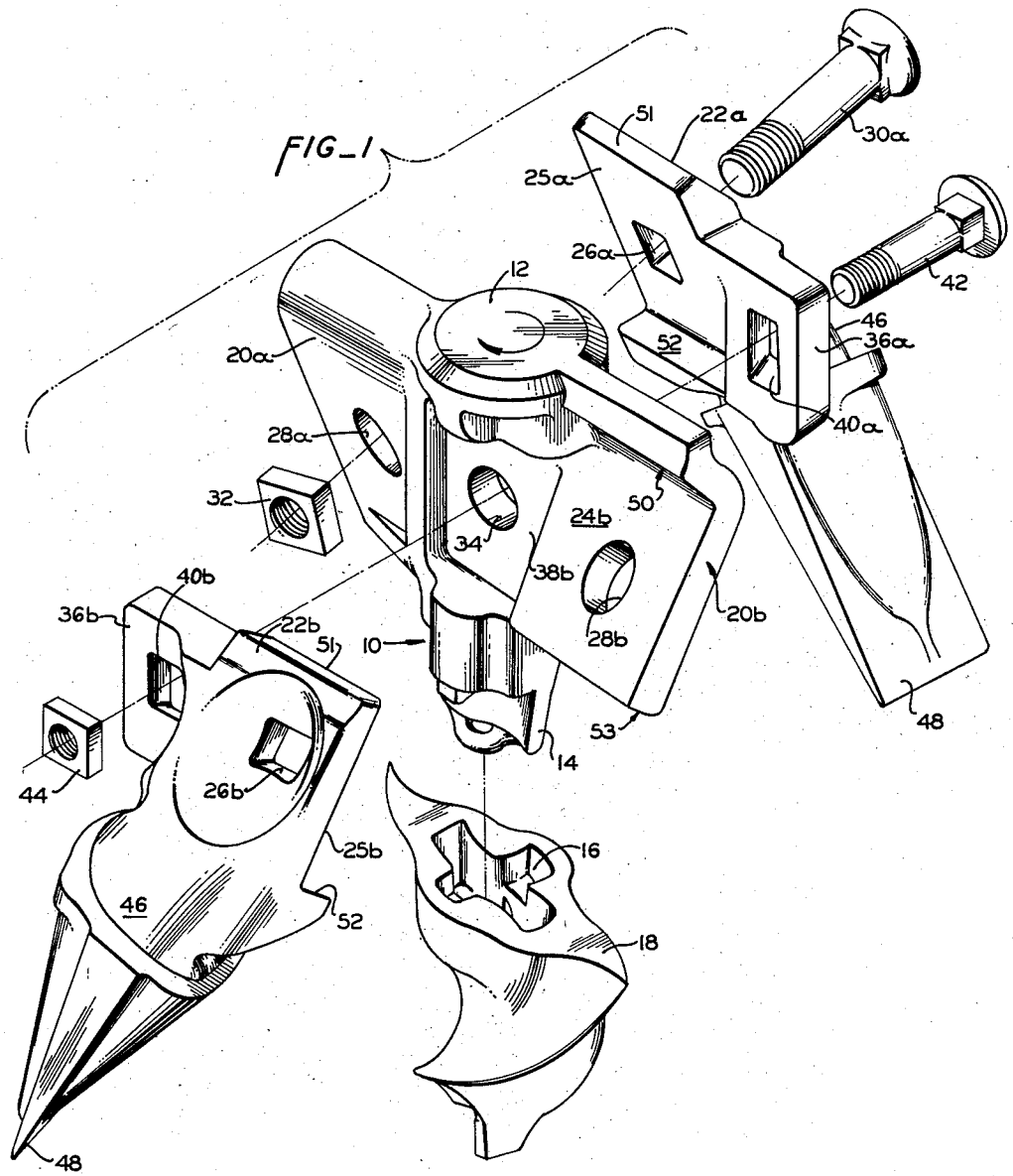
FIG_1
INVENTOR.
GERALD A.M. PETERSEN
BY
Hansen and Lane
HIS ATTORNEYS May 12, 1959  G. A. M. PETERSEN  2,886,292
HEAVY DUTY CUTTING HEAD FOR EARTH BORING TOOLS
Filed April 9, 1956  2 Sheets-Sheet 2
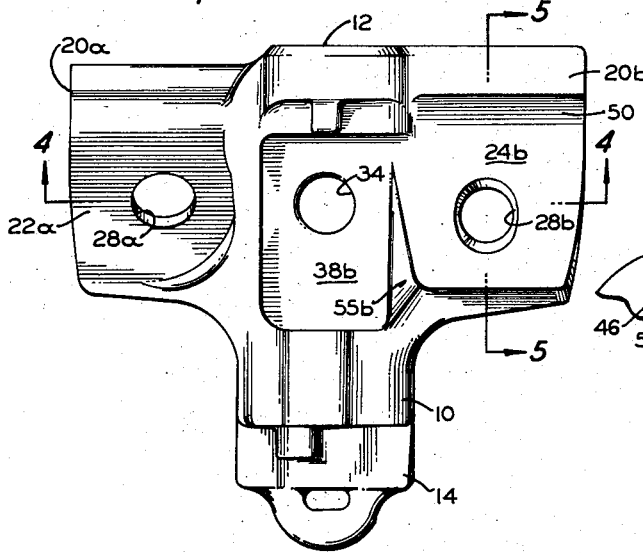
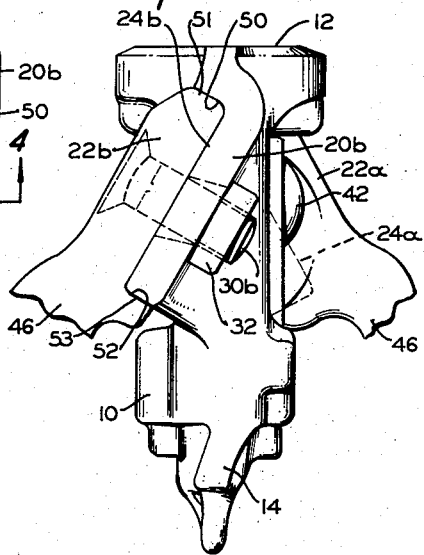
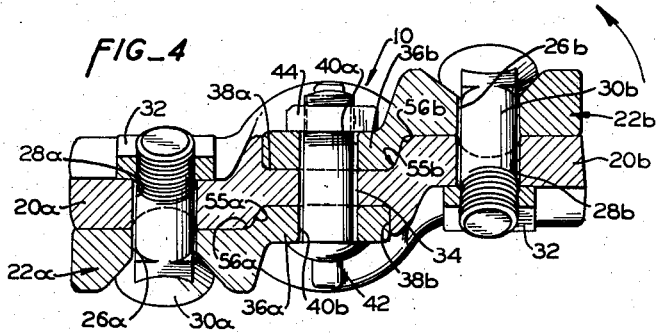
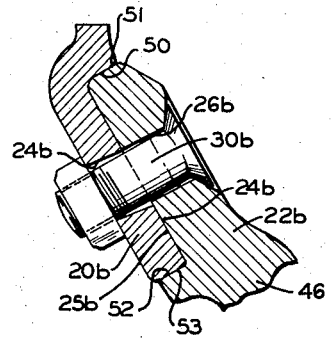
INVENTOR.
GERALD A. M. PETERSEN
BY
HIS ATTORNEYS

United States Patent Office 2,886,292
Patented May 12, 1959

2,886,292

HEAVY DUTY CUTTING HEAD FOR EARTH BORING TOOLS

Gerald A. M. Petersen, Santa Clara, Calif.

Application April 9, 1956, Serial No. 577,153

11 Claims. (Cl. 255—61)

The present invention relates to earth-boring tools. More particularly the present invention relates to the cutting heads that are secured to the end of the drill shafts of earth-boring tools.

Cutting heads of this type comprise usually a central body portion which supports the earth-cutting teeth in proper operating position in such a manner that they may readily be replaced when worn down or otherwise damaged. For this purpose the body portion is usually provided with radially projecting support members or wings to which are detachably secured plates that carry downwardly slanting shanks over which the actual cutting teeth are drawn and which hold the teeth in a forwardly directed, downwardly slanted position. When the teeth have to be exchanged, the shank supporting plates need not be detached from the supporting members. The teeth are merely removed from the shanks, and new teeth are drawn over and secured to the shanks, whereupon the cutting head is again ready for use.

Cutting heads of this general arrangement are well known in the art. The general aspects are clearly explained and illustrated in my U.S. Patent No. 2,578,014, dated December 11, 1951. The present invention contemplates certain novel improvements in the construction of boring tool cutting heads as now to be set forth.

It is an object of this invention to provide a composite cutting head, of the type referred to, that is of simple construction and may readily be disassembled and reassembled.

Another object of the invention is to provide a composite cutting head, of the type referred to, that requires a minimum of components for holding its constituent parts in assembled condition.

A further object of the invention is to provide a heavy duty cutting head that is able to withstand extreme operating conditions without deformation.

Yet another object of the invention is to provide a composite cutting head, of the type referred to, that is of such construction as to preclude torsional displacement or deformation of the teeth-supporting shank plates in their position relative to each other and to the body portion of the cutting head, as the teeth encounter rocks, ice, or perma frost in the ground during practical operation of the boring tool.

An additional object of the invention is to provide a composite cutting head for earth-boring tools, with means effective to resist torsional displacement and/or deformation of its constituent parts such as might shear off the members that maintain the cutting head in assembled condition.

Another object is to provide a heavy duty boring head in which the shank plates are so shouldered as to interfit with conforming shoulders and recesses on the shank supporting wings. In this connection it is a further object to provide shank plates and supporting wings therefor so constructed as to require a minimum number of securing bolts. This object further contemplates the provision of shank plates so related as to be secured to the axial portion of the cutting head by a common bolt. This feature in conjunction with the interfitting relation of the shank plates with their respective supporting wings facilitates attachment between the two by a single bolt. Thus it will be appreciated that by reason of the interfitting relationship between the shank plates and their respective supporting wings a minimum of shearing stress is developed across the several bolts, the bolts serving as attaching members as distinguished from stress transferring connectors.

These and other objects of my invention will be apparent from the following description of the accompanying drawings which illustrate a preferred embodiment thereof and wherein:

Fig. 1 is an exploded perspective of a cutting head embodying the invention.

Fig. 2 is a side elevation of the body portion only of the cutting head illustrated in Fig. 1.

Fig. 3 is a fragmentary side elevation of the cutting head shown in Fig. 1 with shank plates attached and as seen viewed from a direction at right angles to the direction in which Fig. 2 is viewed.

Fig. 4 is a horizontal section through the cutting head shown in Fig. 1, taken along line 4—4 of Fig. 2 with the shank plates attached thereto; and Fig. 5 is a vertical section through one wing of the cutting head shown in Fig. 2, as seen along line 5—5 thereof and with the shank plate associated therewith attached thereto by a bolt.

The cutting head of the invention comprises a centrally located body portion in the form of a post 10 having on top a flat circular surface 12 adapted to be welded to the lower end of the drill shaft (not shown) of an earth-boring tool in a conventional manner. At its lower end the body portion 10 is provided with suitable adapter means, such as the key structure 14, which fits into a corresponding socket 16 provided in a pilot bit 18 and serves to secure said bit to the body portion 10. Pilot bits of this type and the manner in which they are secured to the body portion of cutting heads for boring tools are described in detail in my U.S. application Serial No. 414,007, filed March 4, 1954 and issued December 11, 1956 as U.S. Patent No. 2,773,673.

Integral with the body portion 10 and projecting laterally from diametrically opposite sides thereof are wing-shaped members 20a and 20b upon which are supported the plates 22a and 22b respectively, that mount the cutting teeth. The support members 20a and 20b have downwardly slanting leading surfaces 24a and 24b respectively against which bear corresponding surfaces 25a and 25b formed on the trailing sides of the plates 22a and 22b. For attaching the plates 22a and 22b to the support members 20a and 20b the plates are provided with apertures 26a and 26b which register with apertures 28a and 28b provided in the support members 20a and 20b respectively, whenever the plates 22a and 22b are properly positioned upon the surfaces 24a and 24b of said supporting members. When thus positioned, bolts 30a and 30b may be inserted into the passages formed by the aligned apertures 26a, 28a and 26b, 28b, respectively. Thereafter nuts 32 are engaged over the protruding ends of said bolts and are tightened against the trailing surfaces of the supporting members.

To hold the plates 22a and 22b securely in their proper position so that they may not yield laterally about the bolts 30a and 30b during operation of the cutting head, it is necessary that at least a second point of attachment be provided for each of said plates. In accordance with my invention I arrange matters in such a manner that a single additional bolt provides such a second point of attachment common to both of the plates 22a and 22b. Having reference to Figs. 1, 2 and 4, the body portion 10 of the cutting head is traversed by a horizontal bore 34 that passes intermediately of the support members 20a and 20b substantially at the level of the bores 28a and 28b thereof. Each of the plates 22a and 22b is provided with a vertically disposed lateral extension 36a and 36b respectively which is adapted to fit into a corresponding recess 38a and 38b provided in the opposite sides of the body portion 10 intermediately of the wing-shaped support members 20a and 20b. When these extensions 36a and 36b are seated in their respective recesses 38a and 38b, apertures 40a and 40b provided in said extensions register with the bore 34 so that a bolt 42 may be inserted into the passage formed by the bore 34 and the apertures 40a and 40b. Thereafter, when a nut 44 is engaged over the protruding end of the bolt 42 and tightened against extension 36a or 36b, as the case may be, each plate 22a and/or 22b is securely fastened at two points, once by the common bolt 42 to the central body portion 10 of the cutting head, and again at its respective supporting member 20a and/or 20b by the bolt 30a and/or 30b, respectively. Thus the plates 22a and 22b cannot be twisted out of their proper position during practical operation of the cutting head.

At the ends remote from the supporting members 20a and 20b the plates 22a and 22b are each provided with a downwardly directed shank 46 over which the actual cutting tooth 48 is drawn, and upon which said tooth is detachably locked in its proper operating position in a manner described in my U.S. Patent 2,578,014.

During practical operation of the cutting head, when its teeth 48 slice into the soil and encounter heavy resistance, such as may be presented by embedded rocks or by permanently frozen ground, the upward thrust imparted to the shanks 46 and transmitted to the shank plates 22a and 22b may be so great that it might under ordinary circumstances bend, break or shear the bolts that hold the shank plates to the members 20a and 20b. Means are therefore provided in accordance with my invention that positively block any displacement in upward direction of the shank plates 22a and 22b upon and relative to their support members 20a and 20b. For this purpose the upper end portion of each of the wing-shaped support members 20a and 20b is turned over its plate-supporting surface 24a and 24b respectively, to form a stop lip or shoulder 50. The upper horizontal edge 51 of the shank plate abuts against this shoulder 50 as best shown in Figs. 3 and 5. Analogically, each of the shank plates 22a and 22b is arranged to form along the lower end of its support-member-contacting surface 25a and 25b, respectively, a ledge or shoulder 52. This shoulder 52 bears against the horizontal lower edge 53 of its support member 20a or 20b, as the case may be. Thus, the upward thrust imparted to the shank plates during operation of the cutting head is taken up by the shoulders 50 and the lower edges 53 of the support members 20a and 20b. There is, therefore, no danger that the bolts which secure the shank plates to the body portion 10 and the support members 20a and 20b of the cutting head may be bent or sheared off.

In addition to the foregoing it will be noted in Fig. 4 that a shoulder 55a and 55b is formed at the juncture of each wing member 20a and 20b, respectively, with the post-like central body portion 10. Moreover, each shank plate 22a and 22b is provided with a corner recess 56a and 56b conforming with the shoulder 55a and 55b respectively so that the latter fit snugly and securely into each of their respective corner recesses. It should here be noted that the corner recesses are so disposed in relation to the direction of turning (see arrows Fig. 4) that the thrust is into a corner recess 55a and 55b in each of the shank plates 22a and 22b. Thus it will be appreciated that relative movement is minimized between each shank plate and the wing member upon which it is mounted. That is to say, movement of the shank plates radially outward along the wing members is counteracted by the seating of the shoulder 55a and 55b in the respective corner recess 56a and 56b of the shank plate 22a and 22b respectively. In the same manner, upward sliding movement of each shank plate 22a or 22b relative to its respective wing member is counteracted by the interlocking relation between the shoulder 52 on the shank plate with the lower edge 53 of the wing as well as the interlocking action of the upper edge 51 of each shank plate against the shoulder 50 on the upper edge of the wing member. Thus it will be appreciated that a minimum of shearing action can occur on the single center bolt 42 as well as each of the side bolts 30a and 30b.

In a sense, therefore, these bolts 42, 30a and 30b serve more as attaching means for holding the components in place rather than actual stress transmitting structural members. The shank plates with the cutting teeth supported therefrom, are therefore securely held in their proper position relative to each other and to the body portion in spite of heavy resistance that may be encountered by the cutting teeth during operation of the boring tool. In this manner the cutting head is at all times kept in best operating condition.

The cutting head of the invention is of simple construction, it requires a minimum of connecting members for holding it in assembled condition; it may readily be dis-assembled and reassembled and during operation it remains dependably in its best working condition under the most severe conditions of wear.

While I have explained my invention with the aid of a particular embodiment thereof, it will be understood that the invention is not limited to the specific constructional details shown and described by way of example which may be departed from without departing from the spirit and scope of my invention.

What I claim as new and desire to protect by Letters Patent is:

1. A cutting head for boring tools comprising a body portion; support members projecting laterally from said body portion; tooth-mounting plates adapted to bear against said support members and having lateral extensions adapted to lie adjacent said body portion at opposite sides thereof, when said plates bear against their respective support members; individual means extending through said plates and their respective support members for fastening each plate to its respective support member; and means extending through both said lateral extensions and said body portion for fastening said plates to said body portion.

2. A cutting head for boring tools comprising a body portion, a pair of downwardly slanting support members integral with and projecting laterally from said body portion at opposite sides thereof, tooth-mounting plates adapted to overlie said slanting support members and having vertically disposed lateral extensions adapted to lie adjacent opposite sides of said body portion intermediately of said support members thereof when said mounting plates overlie said support members, individual means extending through said plates and their respective support members for fastening each plate to its respective support member, and means extending through the lateral extensions of both said plates and said body portion for fastening both said plates to said body portion.

3. A cutting head for boring tools comprising a body portion adapted for attachment to a drill shaft for rotation coaxially therewith in a predetermined direction, radially projecting support members extending from said body portion at diametrically opposite sides thereof, each said support member having a downwardly slanting leading surface, tooth-mounting plates each having a trailing surface adapted to lie against the leading surface of a respective support member, recesses formed on opposite sides of said body portion intermediate its upper and lower ends and between said radially projecting support members, each said plate having an inwardly disposed extension seated in a respective one of the recesses on opposite sides of said body portion, a common bolt extending through each said inwardly disposed extensions of said plates and said central body portion between them, means fastening said mounting plates to said support members with the trailing surfaces of the former overlying the leading surfaces of the later, and abutment means on said mounting plates and support members for blocking relative displacement thereof in upward direction.

4. A boring tool cutting head comprising a body portion adapted for attachment to a drill shaft for rotation coaxially therewith in a predetermined direction, said body portion having vertically disposed faces on opposite sides thereof, a support member projecting laterally from each side of said body portion and each having a downwardly slanting leading surface adjacent a respective one of the vertical faces on said body portion providing an abutment adjacent the radial outer edge of each said vertical faces, a tooth-mounting plate having a flat portion provided with a trailing surface adapted to lie against the downwardly slanting leading surface of said support member and an inwardly disposed vertical extension forming with said flat portion of said plate a corner recess for receiving the abutment between said support member and said body portion, means fastening said flat portion of said plate to said support member with the trailing surface of the former overlying the leading surface of the latter, and a common bolt extending through both of the inwardly disposed vertical extensions and the body portion between them.

5. A cutting head for boring tools comprising a body portion adapted for attachment to a drill shaft for rotation coaxially therewith in a predetermined direction; a support member projecting laterally from said body portion and having a downwardly slanting leading surface and an edge formed along the lower end of said surface; said body portion having diametrically opposed flat surfaces formed thereon each cooperating with the adjacent downwardly slanting support member to provide a vertical shoulder, a tooth-mounting having a plate providing a trailing surface adapted to lie against the leading surface of said support member and an inwardly disposed vertical extension adapted to lie against the adjacent flat surface on said body portion, said plate having an edge formed along the upper end of its trailing surface; means fastening said mounting plate to said support member with the trailing surface of the former overlying the leading surface of the latter; a stop lip on said support member at the upper end of its leading surface to bear against the upper edge of said mounting plate, a stop shoulder on said plate at the lower end of its trailing surface to bear against the lower edge of said support member, to thereby block displacement of said mounting plate relative to said support member during operation of the cutting head, and a common bolt extending through each of the inwardly disposed vertical extensions of said tooth mountings and the body portion between them.

6. A boring tool cutting head comprising a body portion adapted for attachment to a drill shaft for rotation coaxially therewith in a predetermined direction, said body portion having vertically disposed diametrically opposed faces formed on opposite sides thereof, a support member projecting laterally from each side of said body portion in a plane substantially parallel to said vertically disposed faces, each said support member having a downwardly slanting leading surface providing an abutment adjacent the respective vertical face on said body portion, a tooth-mounting plate having a flat portion provided with a trailing surface adapted to lie against the downwardly slanting leading surface of said support member and an inwardly disposed vertical extension forming with said flat portion of said plate a corner recess for receiving the abutment between said support member and said body portion, a common bolt extending through both of the inwardly disposed vertical extensions and the body portion between them, a forwardly extending stop ledge formed on the upper end of said support member for abutting relation with the upper edge of said plate, a rearwardly projecting shoulder on the lower edge of the trailing face of said plate for abutting relation with the lower edge of said support member, and means for fastening each flat portion of said plate to its respective support member with the trailing surface of the former overlying the leading surface of the latter.

7. A cutting head for a boring tool comprising a body portion adapted for attachment to a drill shaft for rotation therewith in a predetermined direction; a pair of support members projecting laterally from said body portion at opposite sides thereof, each having a downwardly slanting leading surface, a stop lip formed along the upper end of said surface and a leading edge along the lower end of said surface at right angles to the latter; a pair of tooth mounting plates each having a trailing surface adapted to engage the leading surface of a respective one of said support members with its upper edge engaging said stop lip thereon, a stop shoulder formed along the lower end of said trailing surface for engaging th leading edge of a respective one of said support members, and a vertically disposed lateral extension formed integrally with each said mounting plates arranged to lie adjacent said body portion when the plate is supported upon a respective one of said support members with its trailing surface overlying the leading surface of the support member, individual means securing each plate to its respective support member with the top edge of the plate bearing against the stop lip of the support member and the bottom edge of the support member bearing against the stop shoulder of the plate, and means passing through both said extensions and said body portion between them for securing both said plates to said body portion.

8. A heavy duty boring head comprising a central body portion adaped for attachment to the lower end of a drill shaft for rotation coaxially therewith, in a predetermined direction, a pair of diametrically disposed support members each extending radially from said central body portion, said central body portion having diametrically opposed flat vertical surfaces formed thereon each adjacent one of said radially extending support members, the extending portions of each of said support members having a forwardly tending downwardly slanting leading surface providing a shoulder abutment along the radial outermost margin of the respective flat surface on said central body portion, a tooth mounting shank plate having a plate portion overlying the leading surface of each of said support members, bolt means for securing each shank plate to the leading face of its respective support member, each said shank plate having an inwardly disposed extension lying flat against the respective flat surface on said central body portion and cooperating with the plate portion of said shank plate to form a corner recess for receiving the shoulder abutment to thereby resist outward radial movement of said shank plate, and a single bolt extending through both of said extensions and the central body portion of said boring head.

9. A heavy duty boring head comprising a shaft-like central body portion adapted for attachment to the lower end of a drill shaft for rotation coaxially therewith in a predetermined direction, said central body portion having diametrically opposed flat vertical surfaces formed thereon, a pair of diametrically disposed support members each extending radially from said central body portion in a plane parallel to said flat vertical surfaces on the latter, said support members each consisting of a wing having a forwardly tending downwardly slanting leading surface and providing an abutment along the radial outermost margin of the adjacent flat surface on said central body portion, an upturned stop lip formed along the upper edge of each said wing, and a tooth mounting shank plate having a plate portion overlying the leading surface of each of said support members with its upper edge engaging said stop lip, said shank plate having a shoulder formed along its lower edge for receiving and engaging the lower edge of said wing, bolt means for securing each shank plate to the leading face of said support member, each said shank plate having an inwardly disposed extension wrapped around said abutment and lying flat against the respective flat surface on said central body portion so as to counteract outward radial shifting of said shank plate relative to said support wing, and a single bolt extending through both of said extensions and the central body portion of said boring head.

10. A heavy duty boring head comprising a central body portion adapted for attachment to the lower end of a drill shaft for rotation coaxially therewith in a predetermined direction, a support member extending radially from said central body portion, said central body portion having a flat vertical surface formed thereon adjacent said radially extending support member, said support member having a forwardly tending downwardly slanting leading surface providing a shoulder abutment along the adjacent outermost margin of the flat surface formed on said central body portion, a tooth mounting shank plate having a plate portion overlying the leading surface of said support member, bolt means for securing the plate portion of said shank plate to the leading face of said support member, said shank plate having an inwardly disposed extension adapted to lie flat against the flat surface on said central body portion and cooperating with the plate portion of said shank plate to form a corner recess for receiving said shoulder abutment to thereby resist outward radial movement of said shank plate, and a bolt extending through the inwardly disposed extension of said shank plate and the central body portion of said boring head for securing them together.

11. A heavy duty boring head comprising a central body portion adapted for attachment to the lower end of a drill shaft for rotation coaxially therewith in a predetermined direction, a support member extending radially from said central body portion, said central body portion having a flat vertical surface formed thereon adjacent said radially extending support member, said support member having a forwardly tending downwardly slanting leading surface providing a shoulder abutment along the adjacent outermost margin of the flat surface formed on said central body portion, a tooth mounting shank plate having a plate portion overlying the leading surface of said support member, said shank plate having a shoulder formed along its lower edge for receiving and engaging the lower edge of said support member, bolt means for securing the plate portion of said shank plate to the leading face of said support member, said shank plate having an inwardly disposed extension adapted to lie flat against the flat surface on said central body portion and cooperating with the plate portion of said shank plate to form a corner recess for receiving said shoulder abutment to thereby resist outward radial movement of said shank plate, and a bolt extending through the inwardly disposed extension of said shank plate and the central body portion of said boring head for securing them together.

References Cited in the file of this patent
UNITED STATES PATENTS

| | | |
|---|---|---|
| 513,541 | Snyder | Jan. 30, 1894 |
| 1,997,887 | Prior | Apr. 16, 1935 |
| 2,578,014 | Petersen | Dec. 11, 1951 |